United States Patent [19]

King, Jr. et al.

[11] Patent Number: 4,924,586
[45] Date of Patent: May 15, 1990

[54] AUTOMATED FORMING APPARATUS

[75] Inventors: Harold B. King, Jr., Wrightsville Beach; Donald G. Muncy, Wilmington, both of N.C.; Charles W. Sutherland, Nashville, Tenn.

[73] Assignee: General Electric Company, San Jose, Calif.

[21] Appl. No.: 279,009

[22] Filed: Dec. 2, 1988

[51] Int. Cl.⁵ .............................................. G21C 21/00
[52] U.S. Cl. ...................................... 29/723; 29/742; 72/401
[58] Field of Search .................. 376/260, 261, 463; 29/515, 723, 906, 430, 742; 72/400, 401

[56] References Cited

U.S. PATENT DOCUMENTS

| | | | |
|---|---|---|---|
| 2,006,283 | 6/1935 | Staempfli | 72/401 |
| 4,177,548 | 12/1979 | Yarick et al. | 29/797 |
| 4,389,870 | 6/1983 | Boeni et al. | 72/401 |
| 4,627,147 | 12/1986 | Kagi | 29/515 |

Primary Examiner—Daniel Wasil
Attorney, Agent, or Firm—Robert R. Schroeder

[57] ABSTRACT

To form longitudinally spaced pairs of angularly spaced stops in the walls of fuel rod-positioning ferrules utilized in nuclear fuel bundle spacers, the ferrules, cut from tubular stock, are longitudinal oriented in a first station and angularly oriented in a second station using a reference notch cut in one ferrule edge. Successive ferrules are picked from the second station and placed in a die of a punch press. Ferrule exterior surface back-up is provided by the die upon closure, and interior surface back-up is provided by a mandrel inserted in the ferrule bore as the punches converge into stop-forming engagement with the ferrule wall. Formed ferrule discharge is induced by placement of the next ferrule in the die.

10 Claims, 6 Drawing Sheets

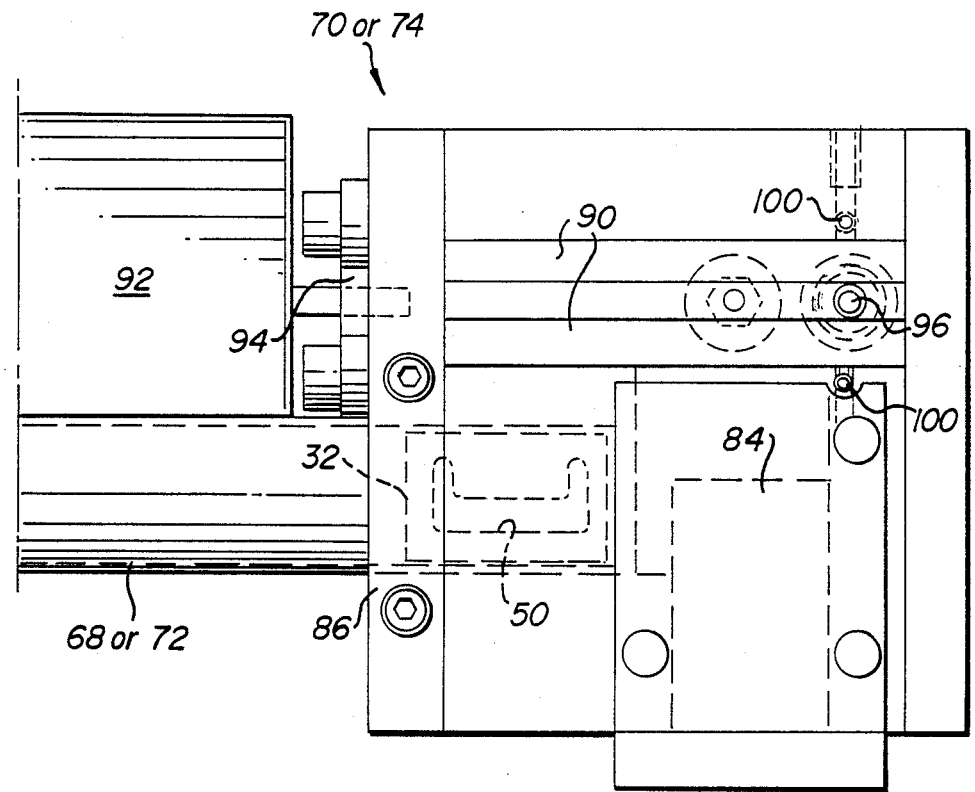
FIG. 6
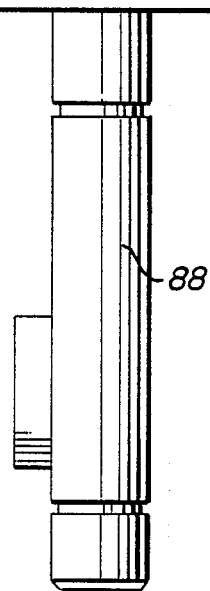

AUTOMATED FORMING APPARATUS

BACKGROUND OF THE INVENTION

Nuclear power reactors are a well known source of energy. In one type of nuclear reactor the nuclear fuel is comprised of elongated rods formed of sealed cladding tubes of suitable material, such as a zirconium alloy, containing uranium oxide and/or plutonium oxide as the nuclear fuel. A number of these fuel rods are grouped together and contained in an open-ended tubular flow channel to form a separately removable fuel assembly or bundle. A sufficient number of these fuel bundles are arranged in a matrix, approximating a right circular cylinder, to form the nuclear reactor core capable of self-sustained a fission reaction. The core is submerged in a fluid, such as light water, which serves both as a coolant and as a neutron moderator.

A typical fuel bundle is formed by an array of fuel rods supported between upper and lower tie plates; the rods typically being in excess of ten feet in length, on the order of one-half inch in diameter and spaced from one another by a fraction of an inch. To provide proper coolant flow past the fuel rods it is important to maintain the rods in precisely controlled, spaced relation such as to prevent bowing and vibration during reactor operation. A plurality of fuel rod spacers are thus utilized at spaced intervals along the length of the fuel bundle for this purpose.

Design considerations of such fuel rod bundle spacers include the following: retention of rod-to-rod spacing; retention of fuel bundle shape; allowance for fuel rod thermal expansion; restriction of fuel rod vibration; ease of fuel bundle assembly; minimization of contact areas between spacer and fuel rods; maintenance of structural integrity of the spacer under normal and abnormal (such as seismic) loads; minimization of reactor coolant flow distortion and restriction; maximization of thermal limits; minimization of parasitic neutron absorption; and minimization of manufacturing costs including adaptation to automated production.

Commonly assigned Matzner et al. U.S. Pat. No. 4,508,679 discloses and claims a nuclear fuel rod bundle spacer uniquely constructed to address these design concerns. As disclosed therein, a spacer is formed of an array of conjoined tubular ferrules surrounded by a peripheral support band, each ferrule thus providing a passage or cell through which a fuel rod or other elongated element of the fuel bundle is inserted. The ferrules are spot welded together and to a peripheral support band to provide an assembly of high structural strength, wherein the thickness of the metal used to form the peripheral support band and ferrules can be minimized to reduce coolant flow resistance and parasitic neutron absorption. Neutron absorption is further decreased by forming the ferrules and peripheral support band of low neutron absorption cross section material.

The rods or elements extending through the ferrules are centered and laterally supported therein between rigid projections and a spring. These rigid projections or stops are formed as fluted or dimpled portions of the ferrule wall at locations near the upper and lower ferrule edges to maximize the axial distance therebetween and thus enhance fuel rod support. The stops are also angularly oriented to minimize projected area and thus disturbance of coolant flow. The formation of these stops in the ferrule sidewall must be accomplished with precision, and their height, as measured from adjacent points on the ferrule peripheral surface to the rod-engaging stop surface, is a critical dimension governing the precise centering of a fuel rod in the ferrule bore. Any eccentricity will adversely effect the uniform distribution of coolant flow through the fuel bundle.

A typical large nuclear reactor core may include on the order of 800 fuel rod bundles, each with as many as seven spacers, and each spacer may comprise sixty fuel rod-positioning ferrules. From this, it is seen that automated, expedited production of these ferrules is of vital importance.

It is accordingly an object of the present invention to provide apparatus for forming surface features in the sidewalls of tubular parts on an automated production line basis.

A further object is to provide forming apparatus of the above-character, wherein the parts are automatically positioned to a requisite orientation prior to forming.

An additional object is to provide forming apparatus of the above-character for creating precision nuclear fuel rod-positioning stops in the sidewalls of ferrules utilized in nuclear fuel bundle spacers.

Another object is to provide forming apparatus of the above-character, wherein the ferrule stops are formed at predetermined plural locations on a multiplicity of spacer ferrules in rapid succession.

Other objects of the invention will in part be obvious and in part appear hereinafter.

SUMMARY OF THE INVENTION

In accordance with the present invention, there is provided an automated apparatus for imparting surface features to the sidewalls of tubular parts. The parts, specifically nuclear fuel rod spacer ferrules in the illustrated embodiment of the invention, are delivered seriatim to a first station where they are arranged in a predetermined end-to-end orientation using a keying feature cut into one edge of the ferrule. From this first station, the ferrules are successively delivered to a second station where they are arranged in a predetermined angular orientation using the same keying feature. A pick and place mechanism transfers each oriented ferrule from the second station to a forming die mounted in a hydraulic press. The die closes to clamp the ferrule and provide back-up for the peripheral and edge surfaces of the ferrule. An expanding back-up mandrel is cammed into the ferrule bore as the press forming stroke begins. Two pairs of punches are pressed into contact with the ferrule to form the plural ferrule stops as dimpled or fluted portions of the ferrule sidewall. Upon opening of the die, the formed ferrule is pushed therefrom into an extractor by the placement of the next ferrule into the die by the pick and place mechanism. The extractor deposits the formed ferrule in an output chute.

The invention accordingly compresses the features of construction, combination of elements and arrangement of parts, all as set forth in the following Detailed Description, and the scope of the invention will be indicated in the claims.

For a full understanding of the nature and objects of the present invention, reference may be had to the following Detailed Description taken in conjunction with the accompanying drawings, in which:

FIG. 6 is a plan view of the common longitudinal and angular ferrule orienting station constructions seen in FIG. 5.

Corresponding reference numerals refer to like parts throughout the several views of the drawings.

DETAILED DESCRIPTION

Figure 1:
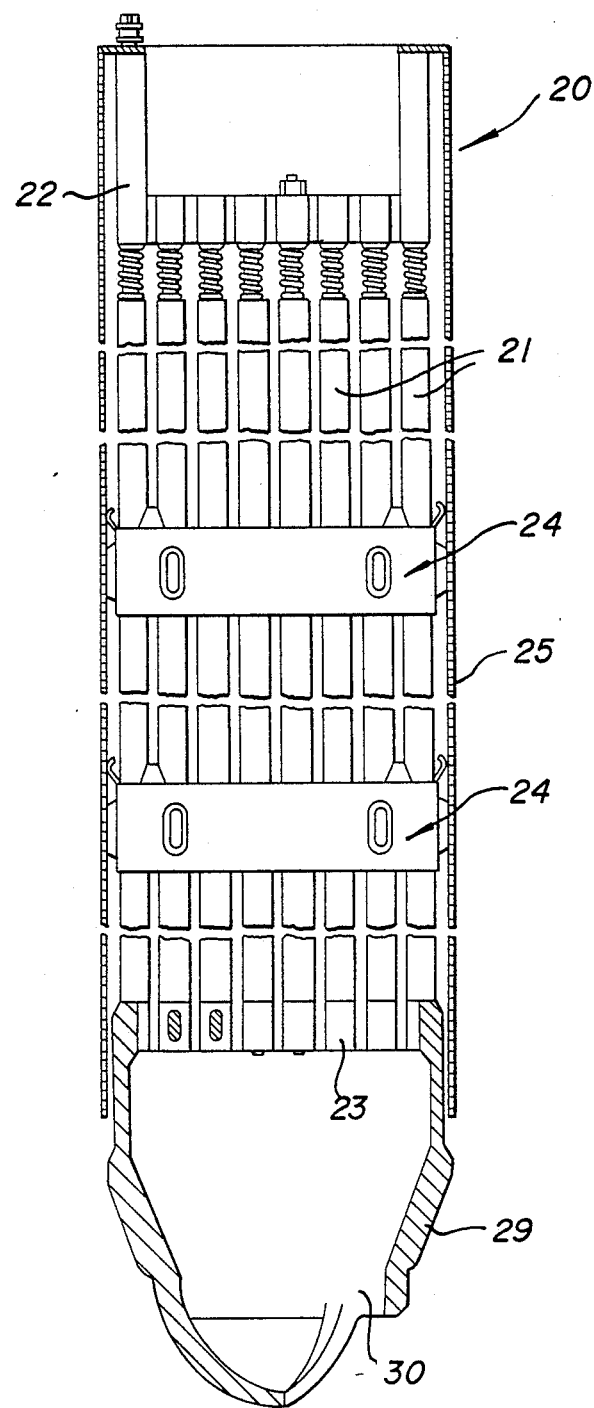
FIG. 1 is an elevational view, partially broken away, of a nuclear fuel bundle.

A fuel bundle, generally indicated at 20 in FIG. 1, comprises a plurality of fuel elements or rods 21 supported between a skeletonized upper tie plate 22 and a skeletonized lower tie plate 23. The fuel rods 21 pass through a plurality of fuel rod spacers 24 which provide intermediate support to retain the elongated rods in spaced relation and restrain them from lateral vibration.

The fuel bundle 20 further includes a thin-walled tubular flow channel 25 of substantially square cross section, sized to form a sliding fit over the upper and lower tie plates 22 and 23 and the spacers 24 so that the channel may readily be mounted and removed. The lower tie plate 23 is formed with a nose piece 29 adapted to support the fuel bundle 20 in a socket of a core support plate (not shown) in the reactor pressure vessel. The end of this nose piece is formed with openings 30 to receive pressurized coolant which flows upwardly through the fuel bundle.

Figure 2:
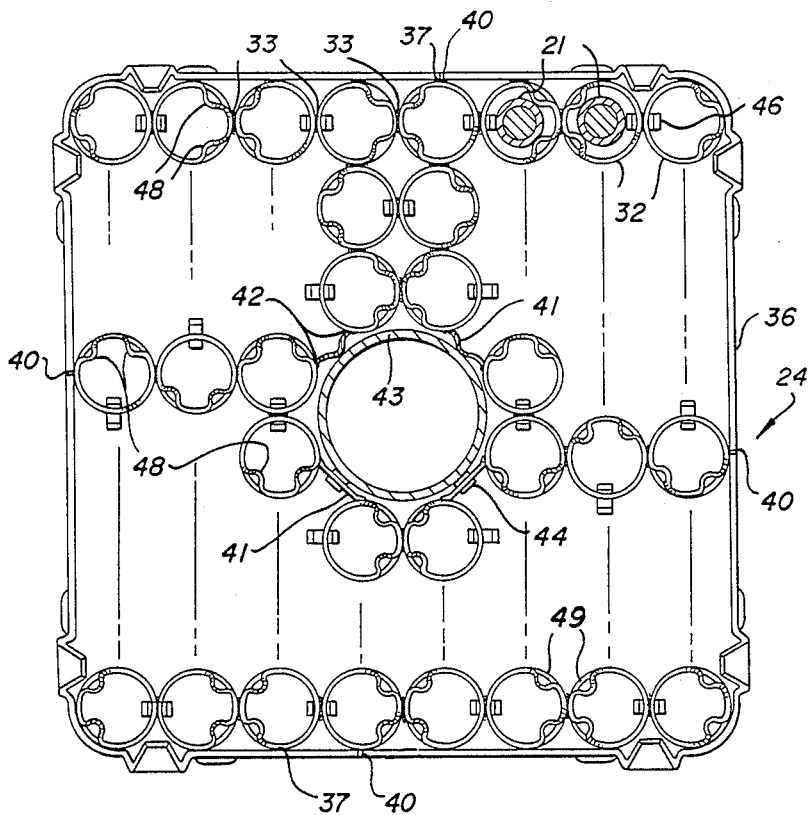
FIG. 2 is a plan view of one of the spacers utilized in the fuel bundle of FIG. 1 and incorporating a multiplicity of fuel rod-positioning ferrules.
Figure 3:
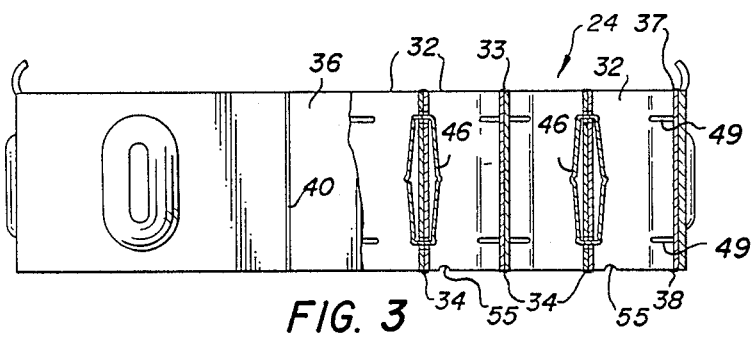
FIG. 3 is a side view, partially broken away of the spacer of FIG. 2.

Each spacer 24, as seen in FIGS. 2 and 3, is made up of ferrules 32 arranged in a matrix array with their points of peripheral abutment conjoined by welding at their upper and lower edges, as illustrated at 33 and 34. The bore of ferrule provides a passage for an elongated element of the fuel assembly, such as fuel rod 21.

A perimetrical band 36 is conjoined to the upper and lower edges of the peripheral ferrules of the assembled matrix at their points of abutment by spot welds 37 and 38. This peripheral support band is assembled in four similar L-shaped pieces, each positioned about a corner of the ferrule array with their abutting ends joined by a seam weld 40. Straps 41 are welded, as indicated at 42, to the ferrules bounding a central opening in spacer 24 for accommodating a water pipe 43. Pipe-engaging springs 44 are carried by a pair of these straps to prevent vibration.

Fuel rods 21, or other elongated elements, extending through the ferrule bores are centered and laterally supported therein between a resilient spring 46 and generally oppositely positioned axially spaced pairs of relatively rigid projections or stops 48. These stops are integrally formed by the apparatus of the present invention seen in FIG. 4 as longitudinally spaced pairs of inwardly projecting, fluted or dimpled portions of the ferrule wall near the upper and lower edges thereof. To facilitate the formation of these stops, circumferential slits 49 are cut into the ferrule sidewall by a prior laser cutting operation such as disclosed in commonly assigned, copending Muncy et al. application entitled "Apparatus for Machining Intricate Feature Cuts in Thin Walled Tubular Parts", Ser. No. 07/279,007, filed concurrently with. In the same operation, C-shaped cutouts 50 are created in the ferrule sidewall to accommodate the capture of spring 46 in a subassembled pair of ferrules as described in Matzner et al. U.S. Pat. No. 4,508,679. Also a keying notch 55 is cut into one edge of each ferrule at a location referenced to the positions of slits 49 and cutout 50 best seen in FIG. 6.

Figure 4:
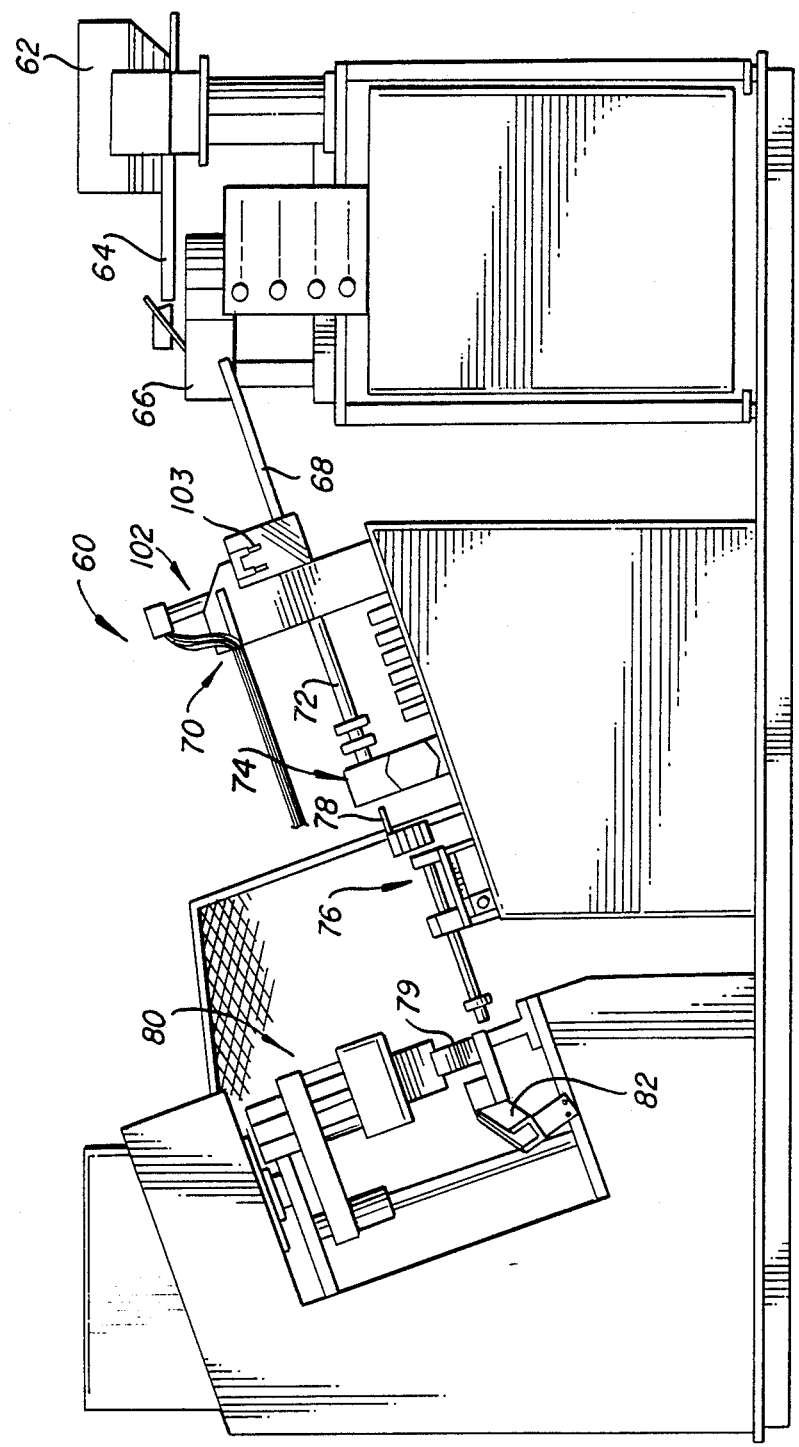
FIG. 4 is an elevational view of automated apparatus for forming the multiple fuel rod-positioning stops in the wall of the spacer ferrules.

The automated forming apparatus of the present invention, generally indicated at 60 in FIG. 4, includes an elevated hopper 62 containing a quantity of ferrules, each having the sidewall feature cuts 49, 50 and 55. The hopper is vibrated on demand to discharge ferrules onto an output tray 64 leading to a vibratory bowl feeder 66. This feeder operates to arrange the ferrules in serial order for successive feeding into an inclined delivery tube 68 leading to a first station, generally indicated at 70 and detailed in FIGS. 5 and 6. This station operates automatically to longitudinally reorient each ferrule end-for-end, if necessary, using edge notch 55. From station 70, the longitudinally oriented ferrules gravitate through an inclined delivery tube 72 to a second station, generally indicated at 74 and also detailed in FIGS. 5 and 6, where the successive ferrules are automatically positioned to a prescribed angular orientation in a pickup position, again using edge notch 55.

Figure 7:
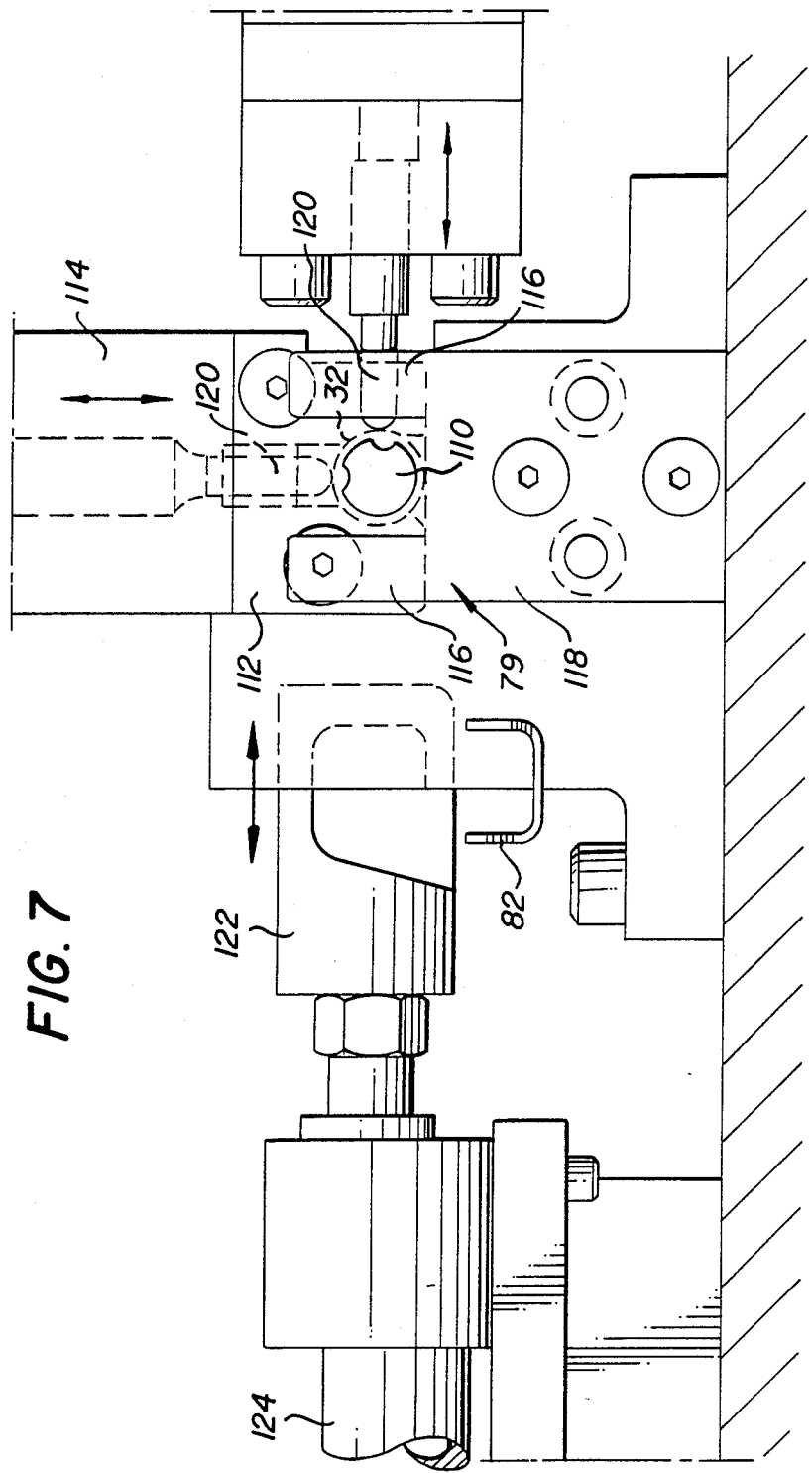
FIG. 7 is a front view of a portion of the stop-forming punch press utilized in the apparatus of FIG. 4.

A conventional pick and place mechanism, generally indicated at 76, is equipped with a pair of fingers 78 which are inserted into the bore of the angularly oriented ferrule in station 74. The fingers are separated to engage the ferrule bore, thus securely gripping the ferrule. The pick and place mechanism is articulated to extract the ferrule from station 74, swing the extracted ferrule through a 180° arc, and place it in the open die 79 of a hydraulic punch press, generally indicated at 80. Upon sensing the presence of a ferrule, a punch press cycle is initiated wherein the die is closed to clamp the ferrule in place and to fully back-up the ferrule peripheral and edge surfaces. The gripper fingers 78 are then withdrawn, and the pick and place mechanism articulates to pick up the next oriented ferrule waiting in the pickup position in station 74. Prior to stop-forming contact with the ferrule in die 79, a mandrel is inserted into the ferrule bore to provide interior surface back up. Once the stops 48 are formed, the die opens up, and the formed ferrule is pushed from the die by the insertion thereinto of the next ferrule by pick and place mechanism 76. An extractor shuttle 122, reciprocated by an air cylinder 124, accepts the discharged, formed ferrule from the die and transfers it to an output chute 82, as seen in FIG. 7.

Figure 5:
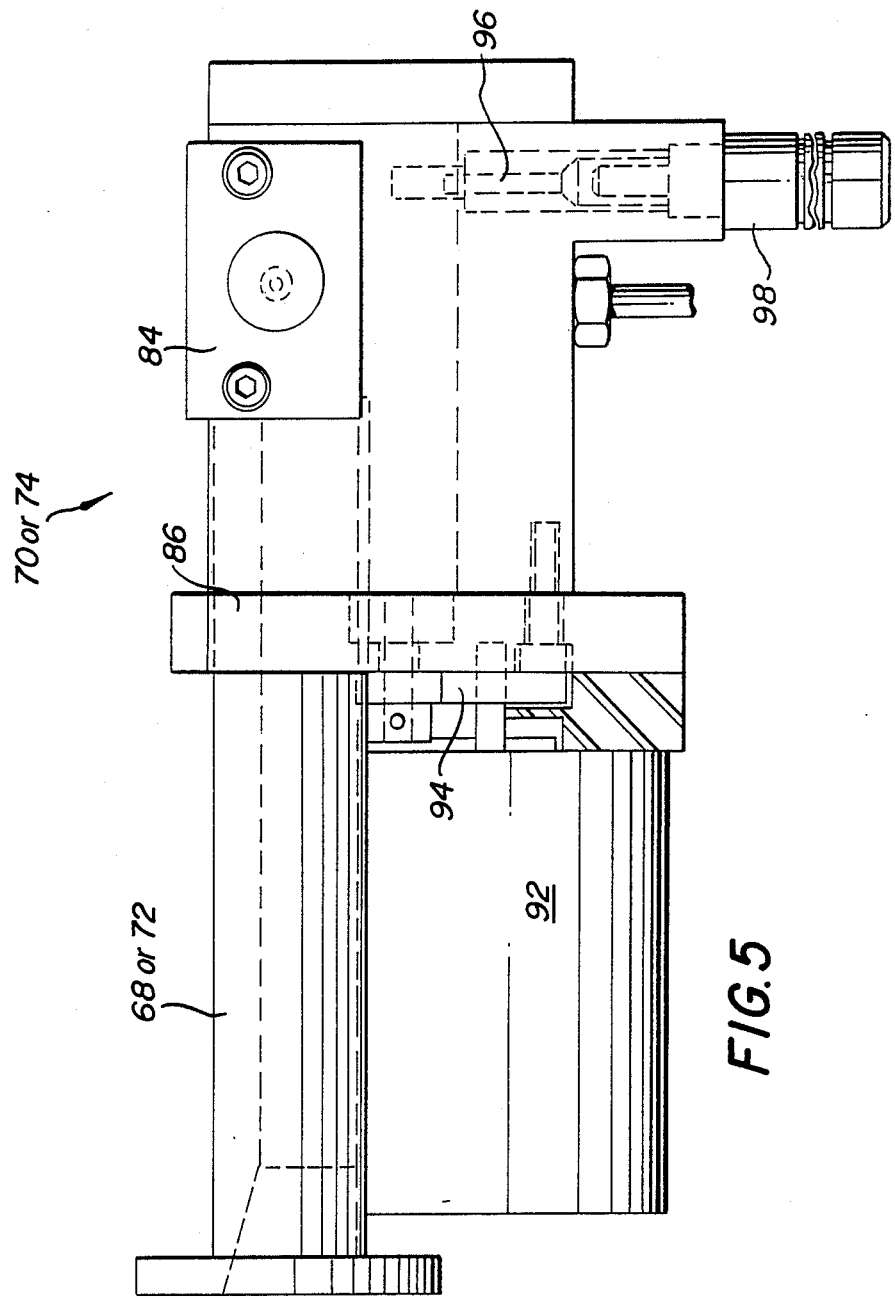
FIG. 5 is a side view of the construction common to both the longitudinal and angular ferrule orienting stations utilized in the apparatus of FIG. 4.

Stations 70 and 74 are of the same basic construction illustrated in FIGS. 5 and 6. Thus ferrules arrive through delivery tube 68 in the case of station 70 (delivery tube 72 in the case of station 74) where they queue up against a transfer shuttle 84 slideably mounted by a fixture 86 for reciprocation by an air cylinder 88. The shuttle picks up the leading ferrule and transfers it laterally onto a pair of inclined rollers 90 journalled by the fixture in closely spaced, parallel relation. These rollers are driven in counter rotation by a motor 92 via gearing 94 to impart axial rotation in one direction to a ferrule supported thereon. A locating pin 96, retractable by an air cylinder 98, projects upwardly between the rollers in a position to intercept the leading edge of a ferrule as it gravitates thereto. In the case of station 70, sensors 100 (FIG. 7) are positioned to look for the ferrule leading edge. If the ferrule leading edge contains notch 55, locating pin 96 becomes lodged therein, allowing incremental forward movement of the ferrule sufficient to enable these sensors to detect the leading edge. In this case, air cylinder 88 is signalled to retract the locating pin, and a ferrule with the desired longitudinal orientation is permitted to gravitate off of rollers 90 and into delivery tube 72 leading to station 74.

On the other hand, if notch 55 is not found by locating pin 96 in an allocated, ample time interval, meaning that the notch is in the ferrule trailing edge, sensors 100 signal an inverting mechanism, generally indicated at 102 in FIG. 4, into action. This mechanism includes a pair of fingers 103 which descend to grasp the ferrule held by the locating pin, raise the ferrule, rotate it end-for-end, and replace the longitudinally reoriented ferrule on rollers 90. In the meantime, locating pin 96 is retracted enabling the ferrule to gravitate, notched edge first, off the rollers and into delivery tube 72.

In the case of station 74, ferrules of the requisite longitudinal orientation are singulated by a reciprocating shuttle 84 for successive lateral transfer onto a set of inclined, counter-rotating rollers 90 where it is axially rotated until its notch 55 is located by a pin 96. When the pin becomes lodged in this notch, motor 92 is signalled to stop by sensors 100, and the ferrule, now properly angularly oriented in a pickup position, awaits pick up by pick and place mechanism 76. Once the ferrule is gripped by fingers 78, locating pin 96 is retracted by its air cylinder 98, clearing the ferrule for extraction from station 74 and transfer to punch press 80.

FIG. 7 depicts die 79 in its closed condition to preserve the angular orientation of the ferrule 32 achieved in station 74 and to back up the ferrule peripheral surface. Interior surface back-up is provided by an expandable mandrel 100 which, as the press strokes downwardly, is cammed into the ferrule bore after the ferrule has been clamped in the die and pick and place fingers 78 have been retracted. An end plate 112 resiliently mounted to the movable upper die half 114 is cammed against the outer edge of the ferrule by overlapping tapered blocks 116 affixed to the stationary lower die half 118 during the final stage of die closure. This edge backup prevents metal outflow as stops 48 are formed. Ferrule inner edge backup is provided by a plate (not shown) affixed to upper die 114 and backed up by a mandrel mounting block (not shown). With die 79 fully closed, two sets of fore and aft punches 120 are pressed into stop forming engagement with the ferrule. When a preset pressure is achieved, the press stroke is reversed, withdrawing the punches and opening the die. The formed ferrule 32 is left in the lower die half to be pushed out by the next ferrule being placed in the die by the pick and place mechanism. An extractor shuttle 122 is positioned rearwardly of the die by its air cylinder 124 to accept the discharged ferrule and is then repositioned to deposit the ferrule in output chute 82, seen also in FIG. 4. This chute routes the ferrules to an automated stop height gauging apparatus such as disclosed and claimed in commonly assigned Reeves et al. copending application Ser. No. 07/279,008, filed concurrently herewith, entitled "Automated Gauging Apparatus".

From the foregoing it is seen that the objects set forth above, including those made apparent hereinabove, as efficiently attained, and, since certain changes may be made in the disclosed embodiment without departing from the scope of the invention, it is intended that matters of detail disclosed herein be taken as illustrative and not in a limiting sense.

Having disclosed the invention, what is claimed as new and desired to secure by Letters Patent is:

1. Automated apparatus for forming inwardly projecting, dimpled surface formations at predetermined locations in the wall of a succession of tubular parts, said apparatus comprising, in combination:
    A. a feeder for arranging the parts in a serial stream;
    B. a first station for accepting successive parts from said feeder and arranging each part in a predetermined longitudinal, end-to-end orientation;
    C. a second station for accepting successively parts from said first station and arranging each part in a predetermined angular orientation at a pickup position;
    D. a punch press including
        (1) a die having opposed die halves movable between open positions and closed positions embracing a part,
        (2) a mandrel for insertion into the bore of a part in said die, and
        (3) a plurality of punches movable into forming engagement with the part wall to create the dimpled surface formations; and
    E. a transfer mechanism for picking each part from said pickup position in said second station and placing the part in said die.

2. The automated forming apparatus defined in claim 1, wherein one edge of each part is keyed with a reference notch, said first and second stations having means for locating the reference notch pursuant to respectively longitudinally and angularly orienting each part.

3. The automated forming apparatus defined in claim 1, wherein one edge of each part is keyed with a reference notch, and wherein said first station includes
    (1) a first retractable locating pin positioned in intercepting relation with the part leading edge,
    (2) first means for rotating each successive part about its axis while axially translating the part toward said first locating pin,
    (3) an inverting mechanism, and
    (4) a first sensor signalling said first locating pin to retract in response to said first locating pin finding the reference notch, and said first sensor, in response to the failure of said first locating pin to find the reference notch, signalling said inverting mechanism to invert the part end-for-end and said first locating pin to retract, whereby each part exits said first station, notched edge first.

4. The automated forming apparatus defined in claim 3, wherein said first part rotating and translating means comprises a pair of elongated, parallel spaced, counter-rotating rollers inclined toward said first station exit, the part being supported on said rollers.

5. The automated forming apparatus defined in claim 3, wherein said second station includes
    (1) a second retractable locating pin positioned in intercepting relation with the part leading edge,
    (2) second means for rotating each successive part about is axis while axially translating the part toward said pickup position, and
    (3) a second sensor signalling said second part rotating and translating means to stop in response to said second locating pin becoming lodged in the reference notch, thereby establishing the part in said pickup position in a predetermined angular orientation for pickup by said transfer mechanism.

6. The automated forming apparatus defined in claim 5, wherein said second part rotating and translating means comprises a pair of elongated, parallel spaced, counter-rotating rollers inclined toward said pickup position, the part being supported on said rollers.

7. The automated forming apparatus defined in claim 6, which further included a separated, inclined delivery tube for serially routing parts from said feeder to said first station and from said first station to said second station.

8. The automated forming apparatus defined in claim 7, which further includes a reciprocating extractor shuttle positionable rearwardly of said die for accepting a formed part pushed therefrom by the placement of the next part in said die by said transfer mechanism.

9. The automated forming apparatus defined in claim 8, wherein said transfer mechanism includes articulating fingers insertable in the bore of a part in said pickup position to grip the part for transfer to said die.

10. The automated forming apparatus defined in claim 9, wherein the parts are fuel rod-positioning ferrules utilized in fuel bundle spacers, and the dimpled surface formations are centering stops for a fuel rod inserted through the ferrule bore, said punches arranged to form the stops in pairs at angularly spaced locations adjacent each ferrule end.

* * * * *